United States Patent Office 3,790,684
Patented Feb. 5, 1974

3,790,684
PACKAGES WITH IMPROVED PROPERTIES
Quirino A. Trementozzi, Springfield, Mass., assignor to Monsanto Company, St. Louis, Mo.
No Drawing. Continuation-in-part of abandoned application Ser. No. 814,184, Apr. 7, 1969, which is a continuation-in-part of application Ser. No. 642,207, May 29, 1967, now Patent No. 3,451,538. This application Jan. 25, 1971, Ser. No. 109,710
Int. Cl. B65b 3/00; B32b 27/30; B65d 23/00
U.S. Cl. 426—106　　　　　　　　　　　　　　11 Claims

ABSTRACT OF THE DISCLOSURE

Packages of foodstuffs, medicines or related substances enveloped in a molded container formed in an essentially solvent-free condition from a copolymer of acrylonitrile and 10 to 42 percent of a vinyl ester and/or vinyl ether. The resin exhibits oxygen permeability of less than 6:5 cc./100 sq. in. 24 hrs. atmos. mil at 73° F. and water vapor transmitted of less than 8.5 gms./24 hr. 100 sq. in. mil at 100° F. and 95% R.H. so as to protect the contents of the container from degradation.

CROSS REFERENCE TO RELATED APPLICATIONS

This is a continuation-in-part of copending application Ser. No. 814,184, filed Apr. 7, 1969, now abandoned, which in turn was a continuation-in-part of application Ser. No. 642,207, filed May 29, 1967, now U.S. 3,451,538, which in turn was a continuation-in-part of application Ser. No. 544,107, filed Apr. 21, 1966, now abandoned.

BACKGROUND OF THE INVENTION

The currently available synthetic polymers which are used in the preparation of packaging material for foodstuffs, medicines and related substances are characterized by one or more serious deficiencies which detract from their packaging utility. Most synthetic polymers with good thermal forming or processing characteristics have a high rate of oxygen permeability and water vapor transmission so that foods and medicine packaged in these materials suffer water gain or loss, oxidation, discoloration, loss of taste, aroma, etc., thereby losing their customer appeal. Vinylidene copolymers have sufficient oxygen impermeability to permit their use in some food packaging applications. However, the use of these materials has been largely confined to film applications because of the processing difficulties encountered in forming thick walled objects. These vinylidene copolymers have poor heat seal characteristics, poor draw properties, low heat distortion temperatures and thermoforming stability, low modulus and low strength which seriously limits their widespread use. Other polymer systems such as fully hydrolyzed polyvinyl alcohol have very high resistance to oxygen permeability but these systems have serious deficiencies in that they are water sensitive and have a very high water vapor transmission rate. Furthermore, these polyvinyl alcohol polymers fail to retain their excellent resistance to oxygen permeability at conditions of high humidity and in general have poor processing characteristics.

A definite need exists for packages for foodstuffs and medicines formed of thermoplastic resins having high resistance to oxygen permeability and low water vapor transmission rate as well as improved processing and physical properties so that the packages may have diverse shapes and sizes, e.g., blow molded and injection molded bottles, thermoformed sheet material, boxes, etc.

The required degree of oxygen impermeability and water vapor transmission (WVT) in a packaging material will vary with the particular food or medicine to be packaged and the storage conditions, e.g., temperature, humidity, ventilation, light type and intensity, etc. In general, the more critical applications will require a material with an oxygen permeability below 6.5 cc./100 sq. in. 24 hr. atmos. mil at 73° F. and a WVT of less than 8.5 gms./24 hr. 100 sq. in. mil at 100° F. in 95% R.H.

This criticality is illustrated in Modern Packaging, March 1965, "Flexible-Vacuum Performance," p. 201 et seq. wherein the extreme sensitivity of coffee to moisture and oxygen is discussed. The authors of this article state that an increase in the moisture content of coffee of about 1 percent, i.e., from 1.4 to 2.6 percent, will cause a stale odor after 20 days, while only 14 cc. of oxygen will cause staleness in one pound of coffee.

Dairy foods, meat products and some medicines show as much if not greater oxygen and moisture sensitivity as coffee and in some instances require packaging materials with even greater impermeability to oxygen and water vapor than that required for coffee packaging.

This invention is directed towards packages for foodstuffs and medicines designed to meet these more critical packaging requirements.

It is, therefore, an object of this invention to provide novel packages of foods, medicines, and relates objects, wherein the package is formed from resins which exhibit high resistance to oxygen permeability and low water vapor transmission rate as well as improved processing and physical properties.

A further specific object is to provide such packages utilizing containers formed from the molten resin in a solvent-free condition.

SUMMARY OF THE INVENTION

The above and other objects are obtained by providing packages comprising foods, medicines and other related substances enveloped in a molded container wherein the molded container is formed from a thermoplastic resin which exhibits oxygen permeability of less than 6.5 cc./ 100 sq. in. 24 hr. atmos. mil at 73° F. and water vapor transmission of less than 8.5 gms./24 hr. 100 sq. in. mil at 100° F. and 95% R.H. The resin is comprised of (A) 75 to 100 parts by weight of the interpolymer formed as the polymerization product of acrylonitrile and at least one comonomer selected from the group consisting of vinyl esters, vinyl ethers and mixtures thereof and (B) 0 to about 25 parts by weight of the product of the graft polymerization onto a preformed rubber substrate of a monomer mixture of 55 to 90 weight percent acrylonitrile and, correspondingly, 45 to 10 weight percent of the comonomer selected in the interpolymer of (A) above, the total acrylonitrile in the resin comprising 55 to 90 weight percent thereof. The container is formed by molding the molten resin in an essentially solvent-free condition or by forming a sheet produced from the molten resin in an essentially solvent-free condition.

The component responsible for the improved barrier properties described in this invention is the acrylonitrile component which must be present in an amount of at least 55 weight percent of the total resin weight. This is necessary in order to obtain a WVT of less than 8.5 gms./24 hr. 100 sq. in. mil at 100° F. and 95% R.H. and an oxygen permeability of less than 6.5 cc./100 sq. in. 24 hr. atmos. mil at 73° F. These levels of permeance are the maximum limits tolerable for use in areas requiring critical barrier properties, if product degradation, oxidation or loss of taste and/or aroma is to be avoided. Even within this area, certain products require packaging materials with correspondingly lower oxygen permeability and WVT rates than others.

DETAILED DESCRIPTION OF THE PREFERRED EMBODIMENTS

The weight percent of acrylonitrile used in the interpolymers of this invention is from 55 to 90 weight percent with 60 to 85 weight percent being preferred. Especially preferred are interpolymers having an acrylonitrile content of 65 to 80 weight percent.

The lower limit of 55 weight percent acrylonitrile is essential if the packaging material is to be used in the critical packaging applications discussed above. The upper limit of 90 percent is critical in order to maintain the low rate of WVT and to provide a resin that is readily processable into bottles, containers, sheets and the like in a solvent-free condition. As the acrylonitrile content of the polymer exceeds 90 weight percent and approaches 100 weight percent, it becomes extremely difficult to shape the polymer into bulky objects (e.g., bottles, containers, sheets, etc.) in conventional plastic forming equipment. Thin films of polymers containing more than 90 percent acrylonitrile are most conveniently prepared by solvent casting processes which are not readily or economically adapted to forming bulky objects. Upon heating to about 220° C., resins containing more than 90 percent acrylonitrile retain sufficient crystallinity essentially to preclude flow. When heated to the still higher temperatures that are required to melt the crystalline acrylonitrile chains (approximately 285° C.), the polymer rapidly degrades as shown by discoloration and reduced solubility in dimethyl formamide, dimethyl acetamide, etc. Thus, the physical properties (associated with polymers containing greater than 90 percent acrylonitrile) seriously limit the thermoforming of bulky objects.

However, the presence of at least one vinyl ester and/or vinyl ether comonomer in the acrylonitrile resins of this invention either prevents long sequences of acrylonitrile placement which gives rise to crystallinity or minimizes crystal size and perfection. This provides a polymer with a lower melting temperature range and good flow behavior at lower temperatures.

As a result, the resins not only exhibit good barrier properties but also have the critical properties which allow them to be readily shaped into sheet material for thermoforming and injection or blow molding into bottles and other shapes. The resultant containers meet the critical packaging requirements for the applications contemplated herein.

The balance of the polymer is prepared from one or more vinyl ester or vinyl ether monomers which are copolymerizable with acrylonitrile although small amounts (less than 10 percent) of one or more other ethylenically unsaturated monomers may be included in the interpolymers.

The vinyl ester monomers have the following general formula:

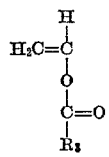

wherein $R_3$ is selected from the group comprising hydrogen, alkyl groups of from 1 to 10 carbon atoms, aryl groups of from 6 to 10 carbon atoms including the carbon atoms in ring substituted alkyl substituents; e.g., vinyl formate, vinyl acetate, vinyl propionate, vinyl benzoate and the like.

The vinyl ether monomers have the general formula: $H_2C=CH-O-R_4$ wherein $R_4$ is an alkyl group of from 1 to 8 carbon atoms, an aryl group of from 6 to 10 carbons, or a monovalent aliphatic radical of from 2 to 10 carbon atoms, which aliphatic radical may be hydrocarbon or oxygen-containing, i.e., an aliphatic radical with ether linkages, and may also contain other substituents such as halogen, carbonyl, etc. Examples of these monomeric vinyl ethers include vinyl methyl ether, vinyl ethyl ether, vinyl n-butyl ether, vinyl 2-chloroethyl ether, vinyl phenyl ether, vinyl isobutyl ether, vinyl cyclohexyl ether, p-butyl cyclohexyl ether, vinyl ether of p-chlorophenyl glycol, etc.

This invention also contemplates the use of a synthetic or natural rubber component upon which the acrylonitrile interpolymer may be in part grafted. The preformed rubber substrates include polybutadiene, isoprene, neoprene, nitrile rubbers, natural rubbers, other conjugated diene elastomers, butadiene interpolymers, ethylene-propylene copolymers, chlorinated rubbers, etc., which are used to strengthen or toughen packaging materials prepared from this invention. The preferred substances are diene rubbers and, most desirably, homopolymers of butadiene or interpolymers thereof with monovinylidene aromatic hydrocarbons and ethylenically unsaturated nitriles such as butadiene/acrylonitrile, butadiene/styrene, and butadiene/styrene/acrylonitrile. Especially preferred are polyblends derived by mixing a graft copolymer of the acrylonitrile and comonomer on the rubbery backbone with a matrix interpolymer of acrylonitrile and the same comonomer as used in the graft. Where such polyblends are employed, the graft polymer component may constitute from greater than zero to about 25 percent by weight of the blend and, preferably, from about 5 to about 25 percent by weight.

The acrylonitrile interpolymers and the graft polymers of this invention may be prepared according to any method well known to those skilled in the art, e.g., by bulk, emulsion, solution, and suspension polymerization methods. They may be prepared at atmospheric, subatmospheric or superatmospheric pressures.

The sheet materials prepared from the foregoing resins may be made by extrusion, pressing, calendering, casting and by other means well known to those skilled in the art. Thereafter, the sheet material is formed or molded into the desired container configuration, usually by heat and pressure, in a conventional thermoforming operation. Bottles and containers may be made by any of the conventional methods such as blow extrusion, injection molding, drawing, etc. Where the materials of this invention are subjected to uniaxial or biaxial orientation, still further improvements in the permeability properties as well as impact resistance may be noted.

This invention also contemplates the use of conventional additives such as dyes, fillers, pigments, plasticizers, stabilizers, etc. in the packaging materials of this invention.

The following examples are given in illustration of the invention and are not to be construed as limitations thereof. All parts and percentages are by weight unless otherwise indicated.

Example 1

This example is set forth as a control to indicate the test methods used and to show the poor results obtained when using an acrylonitrile (AN) containing polymer that contains less than 55 weight percent acrylonitrile.

100 grams of a styrene/acrylonitrile (SAN) copolymer having an acrylonitrile content of 26 weight percent is compression molded at 510° F. and 10,000 p.s.i. for 30 seconds to form a clear transparent film 5 mils thick. This film is cut into rectangular sections and tested for oxygen permeability in a Dow Cell according to ASTM procedure D 1434–63 and for water vapor transmission (WVT) according to ASTM procedure E 96–63T. The following results are obtained:

WVT at 100° F. and 95% R.H. 12.0 gms./24 hr. 100 sq. in. mil

Oxygen permeability at 73° F. 36.0 cc./100 sq. in. 24 hr. atmos. mil

These values are significantly above the maximum that can be tolerated in the more critical packaging applications. The higher values, as will be demonstrated later, are attributed to the fact that insufficient acrylonitrile has been used in the preparation of the polymer.

The WVT rate is given in terms of grams of water transmitted through a film having a thickness of one mil and an area of 100 square inches in a 24-hour period wherein the ambient conditions are maintained at 100° F. and 95% relative humidity (R.H.). The oxygen permeability rate is given in terms of cubic centimeters of oxygen which permeates through a film having a thickness of one mil and an area of 100 square inches during a 24-hour period under one atmosphere (760 mm.) of oxygen at 73° F.

The results in Table 1 illustrate the inferior water and/or oxygen permeability of some other well known packaging materials which do not contain acrylonitrile. These results further emphasize the totally unexpected, superior properties that are achieved when using the polymers of this invention, which contain from 55 to 90 weight percent of acrylonitrile.

TABLE ONE.—WVT AND OXYGEN PERMEABILITY FOR COPOLYMERS WHICH CONTAIN NO ACRYLONITRILE

| Polymer | WVT [1] | Oxygen permeability |
|---|---|---|
| Polystyrene (oriented) | 9.4 | 326.0 |
| Polystryrene (unoriented) | | 416.0 |
| High density polyethylene | 0.85 | 512.0 |
| Low density polyethylene | 1.3 | 510.0 |
| 4-methyl pentene/3-methyl butene [3] | 6.8 | 2,790.0 |
| Polyvinyl chloride | 2.7 | 10.0 |
| Polypropylene (biaxially oriented) | | 140.0 |
| Polycarbonate | | 135.0 |

[1] WVT values given in gms./24 hr. 100 sq. in. mil at 100° F. and 95% R.H.
[2] Oxygen permeability values given in cc./100 sq.in. 24 hr. atmos. mil at 73° C.
[3] Prepared using an 85/15 mol percent monomer feed ratio.

Example 2

The unexpected decrease in WVT obtained when using polymers containing from 55 to 90 weight percent of acrylonitrile is demonstrated by the following Table Two where the WVT for styrene/acrylonitrile polymers is set forth as a function of the weight percent of acrylonitrile.

TABLE TWO.—WVT OF SAN COPOLYMERS

| Wt. percent of— | | WVT [1] |
|---|---|---|
| Styrene | AN | |
| 100 | | 19 |
| 90 | 10 | 27 |
| 80 | 20 | 32 |
| 60 | 40 | 37 |
| 51 | 49 | 22 |
| 40 | 60 | 16 |
| 30 | 70 | 11 |

[1] Measured at 120° F. and 95% R.H.—values in gms./24 hr. 100 sq. in. mil.

A plot of WVT versus weight percent acrylonitrile indicates that the WVT increases to a maximum at 35 to 40 weight percent acrylonitrile. After reaching this maximum, the WVT unexpectedly falls off as the weight percent of acrylonitrile approaches 90. A homopolymer of polyacrylonitrile is not of interest despite similar barrier properties because such a homopolymer cannot be fabricated from the melt; the flow temperature is higher than the decomposition temperature. The only known way to fabricate polyacrylonitrile is by film casting or extrusion from solution. This, however, not only necessitates the use of suitable solvent systems, which, at best, are expensive and unwieldly and which may also create toxicity problems, but also it is not practical to form anything other than thin film sheets from solvent casting, thereby precluding production of shaped articles such as bottles which are an important and integral part of this invention. Forming a shaped article by solvent techniques requires extraction of the solvent over an extended period of time.

Example 3

An interpolymer of 75 percent acrylonitrile and 25 percent vinyl acetate is prepared by an emulsion polymerization process. A compression molded film is prepared and tested in a manner similar to that used in Example 1. The water vapor transmission at 100° F. and 95% R.H. is 1.0 gms./24 hrs. 100 sq. in. mil and the oxygen permeability at 73° F. is 1.5 cc./100 sq. in. 24 hr. atmos. mil which values are well within the desired ranges for the packages of the present invention.

Example 4

An interpolymer of 85 percent acrylonitrile and 15 percent vinyl ethyl ether is prepared by an emulsion polymerization technique. A compression molded film is prepared and tested in a manner similar to that used in Example 1. The water vapor transmission at 100° F. and 95% R.H. is 1.5 gms./24 hrs. 100 sq. in. mil and the oxygen permeability at 73° F. is 1.00 cc./100 sq. in. 24 hr. atmos. mil which values are well within the desired ranges for the packages of the present invention.

Example 5

This example illustrates the preparation of bottles to be used in the packaging of food, medicines and related substances.

Four ounce (4 oz.) Boston Round bottles are prepared using the same polymers as those used to prepare the films in Examples 3 and 4. The bottles were prepared using a blow extruder and a stock temperature of 450–500° F. to give bottles with an average wall thickness of 20 mils. Gas chromatograph tests indicate that these bottles have highly desirable oxygen barrier properties.

Example 6

A graft polymer blend is prepared by an aqueous emulsion process using 600 parts water and 2.0 parts rubber reserve soap as the emulsifier with 1.0 part potassium persulfate as the catalyst. The reactants comprise 100 parts of a butadiene/acrylonitrile (70/30) rubber substrate and 200 parts of an acrylonitrile/vinyl acetate monomer mixture (75/25). After polymerization at about 75° C. for about nine hours, the resulting graft polymerization product is coagulated, washed and dried.

Ten parts of the graft polymerization blend is mechanically blended with 90 parts of the acrylonitrile/vinyl acetate copolymer of Example 3, wherein the acrylonitrile content is 80 percent by weight, forming a homogeneous polymeric product having good barrier properties and improved impact strength.

It should be noted that any acrylonitrile appearing in the rubber upon which grafting takes place, as, for example, the butadiene-acrylonitrile rubber of Example 6, is not included as being part of the 55–90 weight percent acrylonitrile upon which the compositions of this invention are based. In other words, there will be 55–90 weight percent acrylonitrile based on the weight of the total polymeric system in addition to any acrylonitrile which might appear in the rubber.

Thus, it can be seen that the present invention provides packages of foodstuffs, medicines and the like which are essentially protected from degradation due to oxygen permeation and water transmission through the container wall. The containers may be made relatively economically and easily using conventional molding techniques for the molten resin or thermoforming of sheet material made from the molten resin.

I claim:

1. A closed package which protects foodstuffs contained therein from oxygen permeability and water vapor transmission said package comprising foodstuffs contained in a molded container formed from a resin which exhibits oxygen permeability of less than 6.5 cc./100 sq. in. 24 hr. atmos. mil at 73° Fahrenheit and water vapor transmission of less than 8.5 gms./24 hr. 100 sq. in. mil at 100° Fahrenheit and 95% R.H., said resin consisting essentially of the polymerization product of acrylonitrile and at least one other comonomer selected from the group consisting of vinyl esters and vinyl ethers; wherein the vinyl ester monomers have the following general formula:

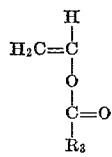

wherein $R_3$ is selected from the group consisting of hydrogen, alkyl groups of from 1 to 10 carbon atoms and aryl groups of from 6 to 10 carbon atoms; and wherein the vinyl ether monomers have the general formula: $H_2C=CH—O—R_4$ wherein $R_4$ is selected from the group consisting of alkyl groups of from 1 to 8 carbon atoms, aryl groups of from 6 to 10 carbons and monovalent aliphatic radicals of from 2 to 10 carbon atoms; wherein the total amount of acrylonitrile in the resin is in the range of from 55 to 90 weight percent thereof, said container having been formed by molding the molten interpolymer in an essentially solvent-free condition or by forming a sheet produced from the molten interpolymer in an essentially solvent-free condition.

2. The package in accordance with claim 1 wherein said comonomer is vinyl acetate.

3. The package in accordance with claim 1 wherein said comonomer is vinyl methyl ether.

4. The package in accordance with claim 1 wherein said comonomer is vinyl ethyl ether.

5. The package in accordance with claim 1 which is in the form of a bottle.

6. A closed package which protects foodstuffs contained therein from oxygen permeability and water vapor transmission said package comprising foodstuffs contained in a molded container formed from a resin which exhibits oxygen permeability of less than 6.5 cc./100 sq. in. 24 hr. atmos. mil at 73° Fahrenheit and water vapor transmission of less than 8.5 gms./24 hr. 100 sq. in. mil at 100° Fahrenheit and 95% R.H., said resin consisting essentially of the polymerization product of acrylonitrile and at least one other comonomer seelcted from the group consisting of vinyl methyl ether and vinyl ethyl ether, wherein the total amount of acrylonitrile in the resin is in the range of 55 to 90 weight percent thereof; said container having been formed by molding the molten interpolymer in an essentially solvent-free condition or by forming a sheet produced from the molten interpolymer in an essentially solvent-free condition.

7. A package as in claim 6 in the form of a bottle.

8. A method for packaging foodstuffs which comprises enveloping the foodstuffs in a molded container formed from a resin which exhibits oxygen permeability of less than 6.5 cc./100 sq. in. 24 hr. atmos. mil at 73° Fahrenheit and water vapor transmission of less than 8.5 gms./24 hr. 100 sq. in. mil at 100° Fahrenheit and 95% R.H., said resin consisting essentially of the polymerization product of acrylonitrile and at least one other comonomer selected from the group consisting of vinyl esters and vinyl ethers; wherein the vinyl ester monomers have the following general formula:

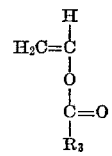

wherein $R_3$ is selected from the group consisting of hydrogen, alkyl groups of from 1 to 10 carbon atoms and aryl groups of from 6 to 10 carbon atoms; and wherein the vinyl ether monomers have the general formula $H_2C=CH—O—R_4$ wherein $R_4$ is selected from the group consisting of alkyl groups of from 1 to 8 carbon atoms, aryl groups of from 6 to 10 carbons and monovalent aliphatic radicals of from 2 to 10 carbon atoms; wherein the total amount of acrylonitrile in the resin is in the range of from 55 to 90 weight percent thereof, said container having been formed by molding the molten interpolymer in an essentially solvent-free condition or by forming a sheet produced from the molten interpolymer in an essentially solvent-free condition.

9. The method of claim 8 wherein the comonomer used to prepare the molded container is selected from the group consisting of vinyl acetate, vinyl methyl ether and vinyl ethyl ether.

10. A method as in claim 8 wherein the molded container is in the form of a bottle.

11. A method for packaging foodstuffs which comprises enveloping the foodstuffs in a molded container formed from a resin which exhibits oxygen permeability of less than 6.5 cc./100 sq. in. 24 hr. atmos. mil at 73° Fahrenheit and water vapor transmission of less than 8.5 gms./24 hr. 100 sq. in. mil at 100° Fahrenheit and 95% R.H., said resin consisting essentially of the polymerization product of acrylonitrile and at least one other comonomer selected from the group consisting of vinyl methyl ether and vinyl ethyl ether, wherein the total amount of acrylonitrile in the resin is in the range of 55 to 90 weight percent thereof; said container having been formed by molding the molten interpolymer in an essentially solvent-free condition or by forming a sheet produced from the molten interpolymer in an essentially solvent-free condition.

References Cited

UNITED STATES PATENTS

| | | | |
|---|---|---|---|
| 3,426,102 | 2/1969 | Solak et al. | 260—85.5 |
| 3,299,018 | 1/1967 | Freedman et al. | 260—85.5 |
| 3,431,244 | 3/1969 | Brealey | 260—85.5 |
| 2,678,925 | 5/1954 | Hagemeyer et al. | 260—85.5 |
| 3,634,547 | 1/1972 | Rose et al. | 260—876 |

FOREIGN PATENTS

| | | |
|---|---|---|
| 887,008 | 1/1962 | Great Britain. |

JOHN G. BLEUTGE, Primary Examiner

U.S. Cl. X.R.

206—46 E, 46 F; 260—4 R, 85.5 ES, 85.52 A, 876 R, 878 R, 879; 424—29; 215—1 C

PO-1050
(5/69)

UNITED STATES PATENT OFFICE
CERTIFICATE OF CORRECTION

Patent No. 3,790,684          Dated February 5, 1974

Inventor(s) Quirino A. Trementozzi

It is certified that error appears in the above-identified patent and that said Letters Patent are hereby corrected as shown below:

Column 1, line 18, "42" should read --- 45 ---.

Column 1, line 32, "Ser. No. 544,107" should read --- Ser. No. 544,109 ---.

Column 5, Table I, heading "Oxygen Permeability" should read --- Oxygen Permeability$^2$ ---.

Add the following references to "References Cited":

| | | | |
|---|---|---|---|
| --- 3,418,406 | 12/68 | Ball | 264-206 |
| 3,565,876 | 2/71 | Ball et al. | 260-85.5 |
| 2,537,626 | 1/51 | Eberly et al. | 260-80.5 |
| 2,436,204 | 2/48 | D'Alelio | 18-54   --- |

Signed and sealed this 9th day of July 1974.

(SEAL)
Attest:

McCOY M. GIBSON, JR.                    C. MARSHALL DANN
Attesting Officer                       Commissioner of Patents